United States Patent
Uysal et al.

(10) Patent No.: US 11,265,296 B1
(45) Date of Patent: Mar. 1, 2022

(54) SYSTEM AND METHOD TO CREATE AND IMPLEMENT VIRTUAL PRIVATE NETWORKS OVER INTERNET FOR MULTIPLE INTERNET ACCESS TYPES

(71) Applicant: ROQOS, INC., Tysons, VA (US)

(72) Inventors: Sezen Uysal, Great Falls, VA (US); Mukul Gandhi, Manassas, VA (US); Onur Akgun, Leesburg, VA (US)

(73) Assignee: ROQOS, INC., Tysons, VA (US)

( * ) Notice: Subject to any disclaimer, the term of this patent is extended or adjusted under 35 U.S.C. 154(b) by 0 days.

(21) Appl. No.: 17/411,807

(22) Filed: Aug. 25, 2021

Related U.S. Application Data (60) Provisional application No. 63/186,800, filed on May 11, 2021.

(51) Int. Cl.
| | |
|---|---|
| *G06F 21/60* | (2013.01) |
| *G06F 21/71* | (2013.01) |
| *H04L 29/06* | (2006.01) |
| *H04L 45/586* | (2022.01) |
| *G06F 21/82* | (2013.01) |

(52) U.S. Cl.
CPC ........ *H04L 63/0272* (2013.01); *H04L 45/586* (2013.01); *H04L 63/0236* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 8,543,734 B2 * | 9/2013 | McDysan | H04M 7/1205 709/249 |
| 2003/0147408 A1 * | 8/2003 | Datta | H04L 47/125 370/401 |
| 2004/0034702 A1 * | 2/2004 | He | H04L 45/02 709/224 |
| 2004/0223500 A1 * | 11/2004 | Sanderson | H04L 63/0272 370/395.53 |
| 2005/0021949 A1 * | 1/2005 | Izawa | H04L 63/0428 713/165 |
| 2011/0206052 A1 * | 8/2011 | Tan | H04L 61/2514 370/395.53 |
| 2014/0123221 A1 * | 5/2014 | Farina | H04L 67/10 726/3 |
| 2015/0023357 A1 * | 1/2015 | Imai | H04L 63/20 370/395.53 |

(Continued)

OTHER PUBLICATIONS

Enhancing the competence of enterprise network using contemporary networking paradigms. Ahuja. (Year: 2014).*

(Continued)

*Primary Examiner* — Venkat Perungavoor
(74) *Attorney, Agent, or Firm* — BakerHostetler (57) ABSTRACT

A system and method are disclosed for making Virtual Private Network (VPN) connections in networks, which currently cannot have VPNs due to technical limitations and some practices by network operators. The system and method are a solution that may be independent of VPN protocols used for making secure connections. The system and method can be used in a public cloud on the internet or a in a private network. The system and method are capable of providing VPN connections "everywhere" and in all connection scenarios.

25 Claims, 6 Drawing Sheets

(56) References Cited

U.S. PATENT DOCUMENTS

| | | | |
|---|---|---|---|
| 2016/0226755 A1* | 8/2016 | Hammam | H04L 12/4633 |
| 2017/0063940 A1* | 3/2017 | Lapidous | H04L 12/4641 |
| 2019/0052630 A1* | 2/2019 | Lapidous | H04L 63/083 |
| 2021/0014151 A1* | 1/2021 | Matsuda | H04W 88/04 |

OTHER PUBLICATIONS

Simple Smart Algorithm for Flexibility of Dynamic Allocation in DHCP Server for SOHO Wireless Router. Syafei. (Year: 2020).*
A Web-based monitor and management system architecture for enterprise virtual private network. Chen. Elsevier. (Year: 2005).*
Interior Gateway Protocol Routing Performance Comparison of the Virtual Private Network Based on Multi Protocol Label Switching and Direct-Link Backup. Nurhaida. Sinergi. (Year: 2020).*

* cited by examiner

SYSTEM AND METHOD TO CREATE AND IMPLEMENT VIRTUAL PRIVATE NETWORKS OVER INTERNET FOR MULTIPLE INTERNET ACCESS TYPES

CROSS-REFERENCE TO RELATED APPLICATIONS

This application claims the benefit of U.S. Provisional Application No. 63/186,800 filed on May 11, 2021, which is hereby incorporated by reference in its entirety for all purposes as if fully set forth herein.

BACKGROUND OF THE DISCLOSURE

1. Field of the Disclosure

This disclosure relates generally to a system to create and implement virtual private networks over the internet. More particularly, this disclosure relates generally to a system to create and implement virtual private networks over the internet for multiple internet access types.

This disclosure further relates generally to a method to create and implement virtual private networks over the internet. More particularly, this disclosure relates generally to a method to create and implement virtual private networks over the internet for multiple internet access types.

2. Related Art

Due to proliferation of internet devices and a limited availability of addresses, such as Internet Protocol version 4 addresses, various Network Address Translation (NAT) technologies have been used to provide internet access while using a minimum number of Internet Protocol (IP) addresses by Internet Service Providers (ISP), cable operators, mobile operators, and/or the like. As these technologies dynamically allocate private IP addresses and port numbers, as in the case of Carrier Grade NAT (CGNAT), direct virtual private network (VPN) connection attempts that require static IP addresses and port numbers are typically blocked.

Figure 6:
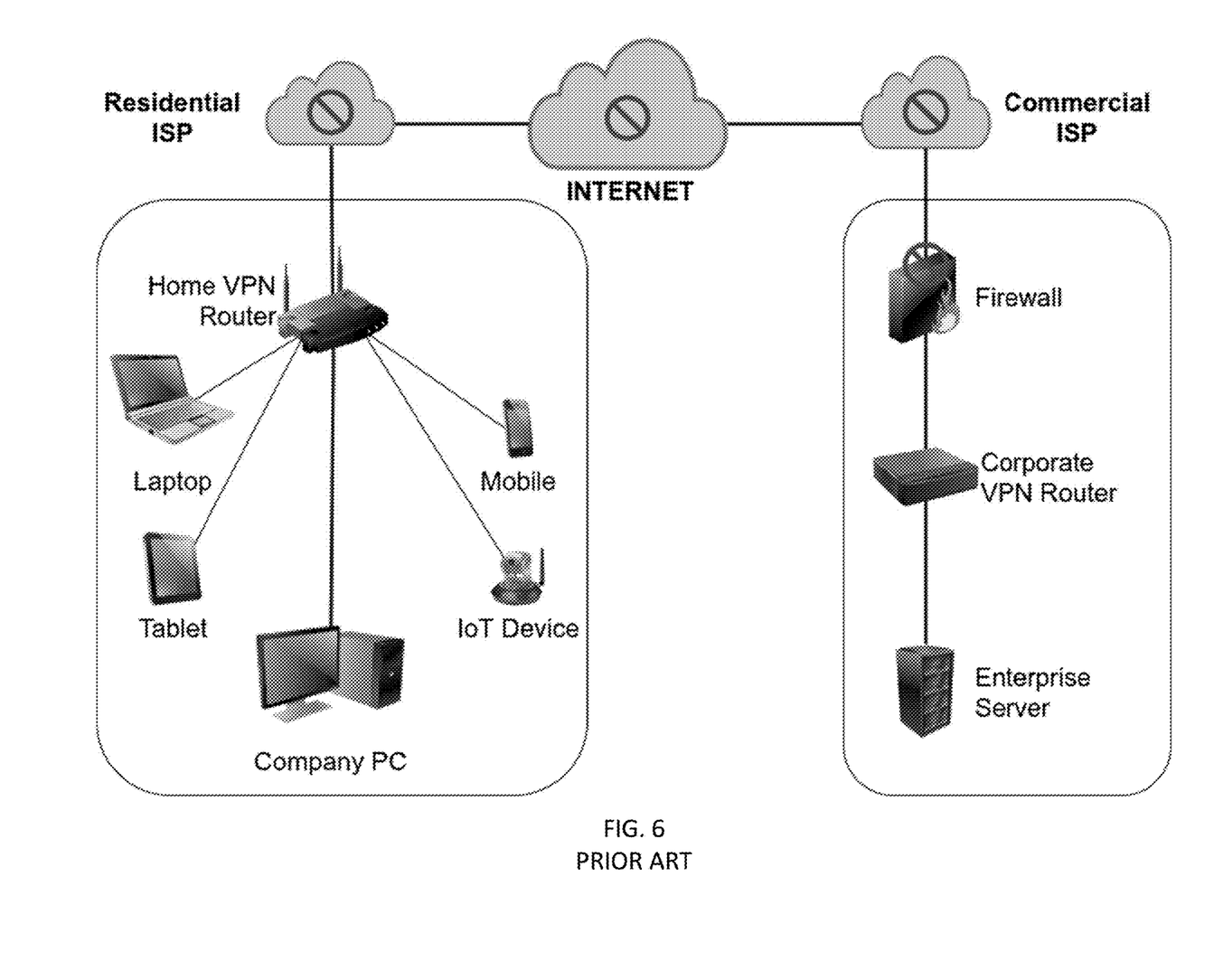
FIG. 6 shows a traditional VPN network diagram where at multiple points in the network various limitations may typically block VPN connections.

In this regard, FIG. 6 graphically illustrates these limitations at multiple points in a network, such as the Internet. For example, a home VPN router may be blocked by a residential ISP provider, may be blocked by the Internet, may be blocked by a commercial ISP provider, and/or the like. Likewise, a corporate VPN router may be blocked by a residential ISP provider, may be blocked by the Internet, may be blocked by a commercial ISP provider, may be blocked by the company firewalls or routers, and/or the like.

Accordingly, what is needed is a solution independent of VPN protocols to make and/or implement VPN connections over any network access technology.

SUMMARY OF THE DISCLOSURE

The foregoing needs are met, to a great extent, by the disclosure, with a system and process implementing a secure network.

One aspect includes a virtual private network (VPN) system configured to create a virtual private network (VPN) over a public network, the virtual private network (VPN) system that includes: a virtual private network (VPN) router configured to monitor communication with a public network, a device, a router, and/or a virtual private network (VPN) server; the virtual private network (VPN) router, after failing to connect directly over the public network to the device, is configured to communicate with the virtual private network (VPN) server to obtain information regarding IP addresses and port numbers of the destination virtual private network (VPN) router that is accessible via the Internet; and the virtual private network (VPN) router is configured to make a connection to one of the IP addresses and port numbers of the destination virtual private network (VPN) router that is accessible via the Internet.

One aspect includes a virtual private network (VPN) method for creating a virtual private network (VPN) over a public network, the virtual private network (VPN) system that includes: monitoring communication with a virtual private network (VPN) router related to a public network, a device, a router, and/or a virtual private network (VPN) server; communicating with the virtual private network (VPN) server to obtain information regarding IP addresses and port numbers that are accessible via the Internet by the virtual private network (VPN) router, after failing to connect directly over the public network to the destination virtual private network (VPN) router; and making a connection to one of the IP addresses and port numbers that are accessible via the Internet with the virtual private network (VPN) router.

One aspect includes a virtual private network (VPN) system configured to create a virtual private network (VPN) over a public network, the virtual private network (VPN) system that includes: an Internet enabled device configured to monitor communication with a public network, another device, a router, and/or a virtual private network (VPN) server; the Internet enabled device, after failing to connect directly over the public network to the destination virtual private network (VPN) router, is configured to communicate with the virtual private network (VPN) server to obtain information regarding IP addresses and port numbers that are accessible via the Internet; and the Internet enabled device is configured to make a connection to one of the IP addresses and port numbers that are accessible via the Internet.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

The disclosure is directed to a device, system, and/or method implementing a solution, independent of VPN protocols, to make VPN connections over any network access technology. As described herein, the disclosed device, system, and/or method, referred to herein as an OmniVPN device, an OmniVPN system, and/or an OmniVPN method, or simply OmniVPN, may implement a solution independent of VPN protocols to make VPN connections over any network access technology. More specifically, the disclosure presents a system and a method to overcome the limitations coming from, related to, and/or the like of a configuration of access routers, ISP practices, and/or the like.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
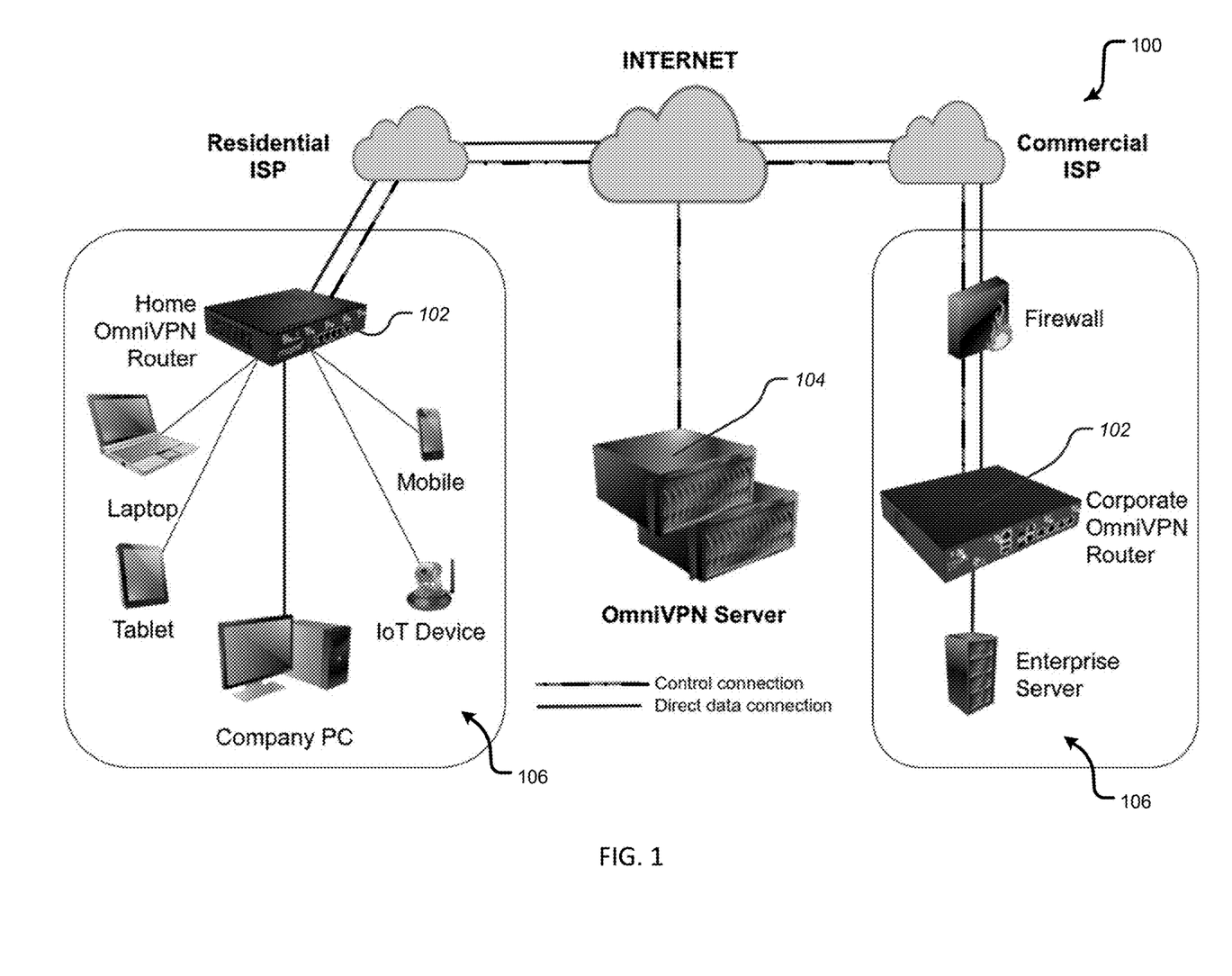
FIG. 1 illustrates an exemplary network diagram of a system implementing the disclosed virtual private network where control connections and direct data connections are established in accordance with aspects of the disclosure.

FIG. 1 illustrates an exemplary network diagram of a system implementing the disclosed virtual private network where control connections and direct data connections are established in accordance with aspects of the disclosure.

Figure 2:
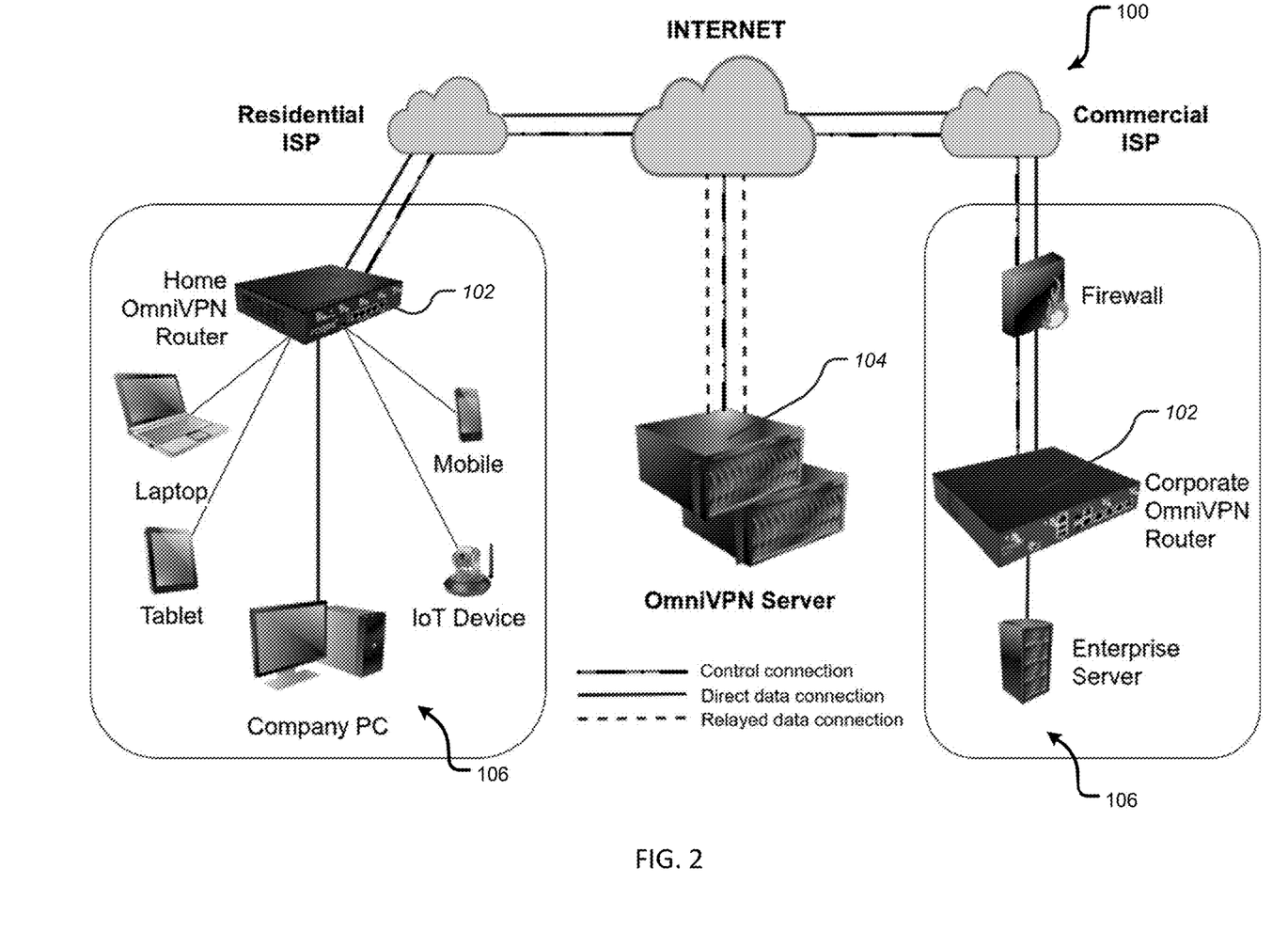
FIG. 2 illustrates an exemplary network diagram of the system of FIG. 1 implementing the disclosed virtual private network where a relayed data connection has been established in accordance with aspects of the disclosure.

FIG. 2 illustrates an exemplary network diagram of the system of FIG. 1 implementing the disclosed virtual private network where a relayed data connection has been established in accordance with aspects of the disclosure.

In particular, FIG. 1 and FIG. 2 show a VPN system 100 that may include a VPN router 102 and/or a VPN server 104. The VPN router 102 may be configured and/or defined as an OmniVPN router based on the capabilities thereof as described herein; and the VPN server 104 may be configured and/or defined as an OmniVPN server based on the capabilities thereof as described herein. The VPN router 102 and/or the VPN server 104 may create a virtual private network (VPN) over a public network, such as the Internet, a residential ISP, a commercial ISP, another type of network as described herein, and/or the like and connect devices 106. More specifically, the VPN system 100, the VPN router 102, the VPN server 104, and/or the like may extend a private network across the public network and enable the device 106 to send and receive data across shared or public networks as if the device 106 were directly connected to the private network. Applications of the device 106 running across the VPN system 100, the VPN router 102, the VPN server 104, and/or the like may therefore benefit from the functionality, security, management, and/or the like of the private network.

The device 106 may be any one or more of an Internet enabled device, a laptop, a tablet, a personal computer (PC), a server, an IoT device, a device implementing Machine to Machine (M2M) communication, a wireless device, a mobile phone, mobile equipment, a mobile hotspot, a wearable device, a mobile station, user equipment (UE), a cellular phone, a smartphone, a handset and/or the like. For example, the device 106 may be implemented as an APPLE® IPHONE®, an IPAD®, a GOOGLE® ANDROID® based device, a BLACKBERRY® based device, other types of PDAs, smartphones, wireless dongles, other mobile computing devices, and/or the like. The device 106 may include a memory, a computer readable memory, an operating system, a communication component, a contact/motion component, a touchscreen controller, a graphics component, an Access Point Name (APN), and/or the like. The operating system together with the various components may provide software functionality for each of the components of the device 106. The various components of the device 106 may be connected through various communication lines including a data bus.

Further, reference in this specification to a "network" is intended to encompass any type of wireless network such as the Global System for Mobile Communication (GSM) network, Code-Division Multiple Access (CDMA) network, 4G network, an LTE network, a 5G network, an IEEE 802.11 (the Wi-Fi protocol) network, a communication channel as defined herein, and/or the like. Additionally, a network as described herein is intended to encompass any type of wired network implementing HTTP (Hypertext Transfer Protocol) running over Transmission Control Protocol (TCP) over IP (Internet protocol), IEEE 802, Ethernet, Wireless LAN, Synchronous optical networking (SONET), Asynchronous Transfer Mode (ATM), personal area network (PAN), local area network (LAN), home area network (HAN), storage area network (SAN), metropolitan area network (MAN), enterprise private network, global area network (GAN), a communication channel as defined herein, and/or the like.

The VPN router 102 may be implemented as a networking device that forwards data packets between computer networks. The VPN router 102 may perform traffic directing functions. The VPN router 102 may include a memory, a computer readable memory, an operating system, a communication component, an OmniVPN feature, an Access Point Name (APN), a firewall application, and/or the like. The operating system together with the various components may provide software functionality for each of the components of the VPN router 102. The various components of the VPN router 102 may be connected through various communication lines including a data bus. In particular aspects, the VPN router 102 may implement, at least in part, an OmniVPN software, an OmniVPN client, an OmniVPN configuration, a OmniVPN feature and/or the like (hereinafter the OmniVPN feature). In aspects, the VPN router 102 may implement at least in part a VPN method 400 as illustrated and described in relation in FIG. 3.

The VPN server 104 may include a memory, a computer readable memory, an operating system, a communication component, an OmniVPN feature, and/or the like. The operating system together with the various components may provide software functionality for each of the components of the VPN server 104. The various components of the VPN server 104 may be connected through various communication lines including a data bus. In particular aspects, the VPN server 104 may implement, at least in part, an OmniVPN software, an OmniVPN client, an OmniVPN configuration, a OmniVPN feature and/or the like (hereinafter the OmniVPN feature). In aspects, the VPN server 104 may implement at least in part a VPN method 400 as illustrated and described in relation in FIG. 3.

As shown in FIG. 1 and FIG. 2, the VPN router 102 implementing the OmniVPN feature may monitor communication with the public network, the device 106, the VPN server 104, and/or the like. The VPN router 102, after failing to connect directly over the network to the destination virtual private network (VPN) router 102, may communicate with the VPN server 104 to learn or otherwise obtain information about each other's public IP addresses and port numbers, and pick the best ones that are accessible via the Internet. In particular aspects, learn or otherwise obtain information about public IP addresses, port numbers, and/or the like of any device or network forming part of the VPN system 100 and pick the best ones that are accessible via the Internet for implementation by the VPN system 100, the VPN router 102, the VPN server 104, the device 106, and/or the like.

Then the originator VPN router implementation of the VPN router 102 (shown as Home VPN router) may attempt to make a connection to one of the learned IP addresses and port numbers as illustrated in FIG. 1. In particular, note the implementations of the VPN router 102 may make both control connections and direct data connections with one another; and the implementations of the VPN router 102 may make control connections with the VPN server 104. This process may be independent of the underlying VPN protocol, which authenticates the connections and encrypts the data packet for secure communications between the various implementations of the VPN router 102 and the device 106.

As illustrated in FIG. 2, if none of the connections work, then the VPN server 104 may establish the connections between the VPN routers through itself, and relay encrypted data packets between the various implementations of the VPN router 102. In particular, note the implementations of the VPN router 102 may make both control connections and direct data connections with one another; and the implementations of the VPN router 102 may make control connections, direct data connections, and relay data connections with the VPN server 104. This process may be independent of the underlying VPN protocol, which authenticates the connections and encrypts the data packet for secure communications between the various implementations of the VPN router 102 and the device 106.

The disclosed implementation of the VPN system 100, the VPN router 102, the VPN server 104, and/or the like may allow making VPN connections through networks where normally it is not possible due to technical limitations, ISP practices such as use of CGNAT, private addresses, blocked port forwarding, and/or the like. Referring to FIG. 6, traditional VPN connections may be blocked at several points as previously described.

As shown in FIG. 1, the VPN router 102 may use the OmniVPN feature to communicate with the VPN server 104 to learn about each other's available public addresses to establish a direct connection (as shown in FIG. 1) or relayed connection (as shown in FIG. 2) via the device 106. The actual VPN authentication, encryption, connection and/or the like may be accomplished by the VPN protocols. The VPN protocols may implement one or more of Internet Protocol Security (IPSEC), Transport Layer Security (SSL/TLS), Datagram Transport Layer Security (DTLS), Microsoft Point-to-Point Encryption (MPPE), Microsoft Secure Socket Tunneling Protocol (SSTP), Multi Path Virtual Private Network (MPVPN), Secure Shell (SSH) VPN, WireGuard protocol, and/or the like. The disclosed implementation of the VPN system 100, the VPN router 102, the VPN server 104, and/or the like may provide a mechanism to bypass network limitations mentioned above, not the VPN protocol.

Figure 3:
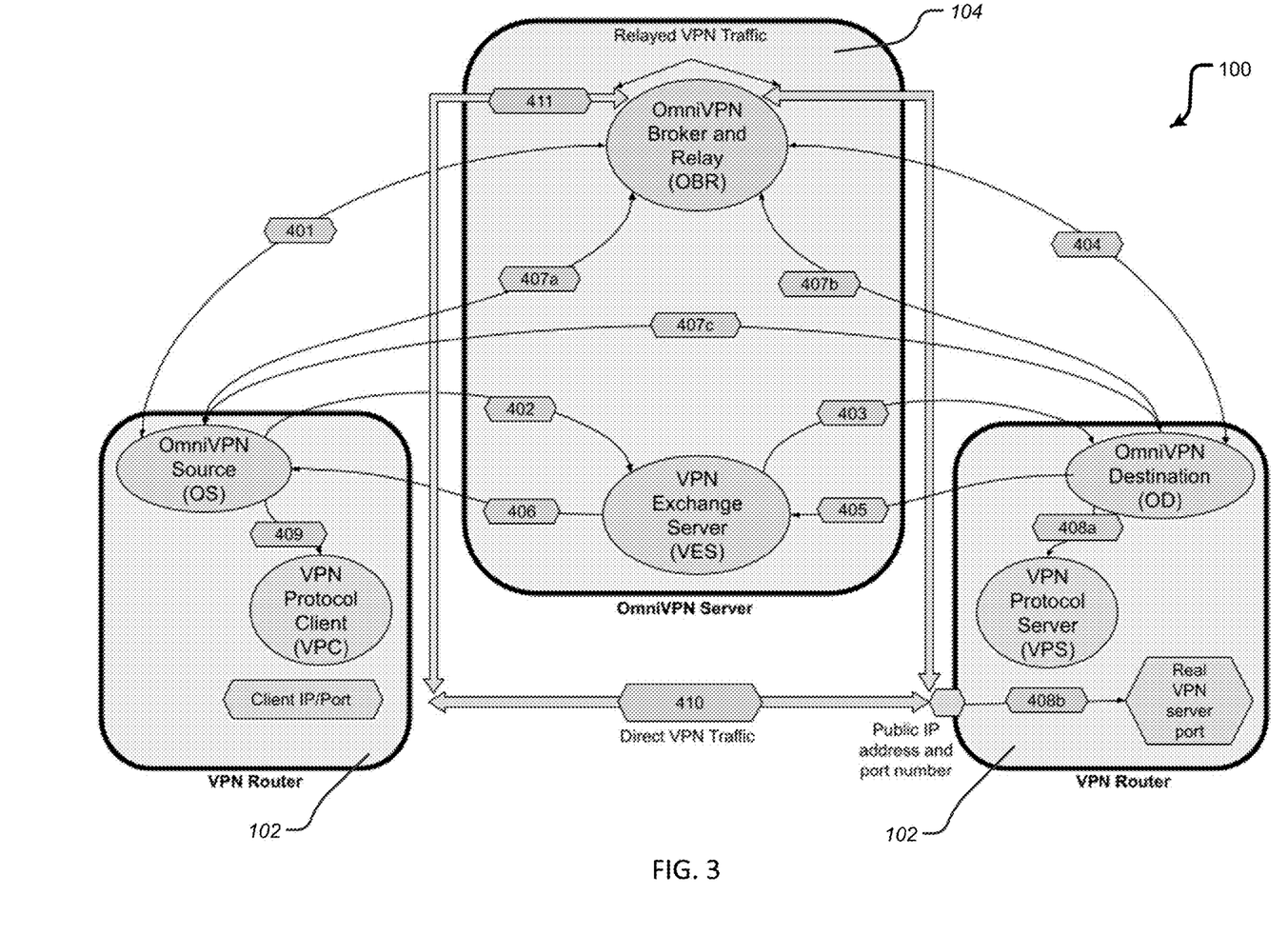
FIG. 3 illustrates an exemplary system implementing an exemplary method with a flow diagram of a VPN Server and VPN routers in accordance with aspects of the disclosure.

FIG. 3 illustrates an exemplary system implementing an exemplary method with a flow diagram of a VPN Server and VPN routers in accordance with aspects of the disclosure.

The disclosed implementations of the VPN system 100, the VPN router 102, the VPN server 104, the device 106, and/or the like may include several components. Referring to FIG. 3, an OmniVPN Source (OS), an OmniVPN Destination (OD), a VPN protocol client (VPC), a VPN protocol server (VPS), a client IP/port, a real VPN server port, and/or the like may be implemented by the VPN router 102. An OmniVPN Broker and Relay (OBR) and VPN Exchange Server (VES) may be implemented by the VPN server 104 and they be used to setup VPN connections for any complex network which normally does not allow making direct VPN connections. The OBR, the OS and/or the OD may use the Interactive Connectivity Establishment (ICE) protocol for establishment of a data path between the OS and the OD of the various implementations of the VPN router 102. The VES implemented by the VPN server 104 may be used for signaling between the OS and the OD of the various implementations of the VPN router 102 using an OmniVPN signaling protocol to carry IP address and port information.

The following steps outline a VPN method 400 that the VPN system 100 may use to be able to make a successful VPN connection between implementations of the VPN router 102, the VPN server 104, the device 106, and/or the like. The VPN method 400 may be implemented at least in part in one or more of the VPN system 100, the VPN router 102, the VPN server 104, the device 106, and/or the like. The VPN method 400 illustrated in FIG. 3 includes numbers that correspond to the labels, data flows, connections, signaling, requests, and/or the like illustrated in FIG. 3 and as further described below.

As illustrated in FIG. 3, the VPN method 400 may include data flows, connections, signaling, requests, and/or the like illustrated with reference to label 401. With reference to label 401, the VPN router 102 and/or the VPN server 104 may operate such that the OS connects to the OBR to obtain ICE candidates.

As illustrated in FIG. 3, the VPN method 400 may include data flows, connections, signaling, requests, and/or the like illustrated with reference to label 402. With reference to label 402, the VPN router 102 and/or the VPN server 104 may operate such that the OS connects to the VES to send its ICE candidates to the OD.

As illustrated in FIG. 3, the VPN method 400 may include data flows, connections, signaling, requests, and/or the like illustrated with reference to label 403. With reference to label 403, the VPN router 102 and/or the VPN server 104 may operate such that the VES informs the OS's ICE candidates to the OD.

As illustrated in FIG. 3, the VPN method 400 may include data flows, connections, signaling, requests, and/or the like illustrated with reference to label 404. With reference to label 404, the VPN router 102 and/or the VPN server 104 may operate such that the OD connects to the OBR to obtain ICE candidates.

As illustrated in FIG. 3, the VPN method 400 may include data flows, connections, signaling, requests, and/or the like illustrated with reference to label 405. With reference to label 405, the VPN router 102 and/or the VPN server 104 may operate such that the OD responds to VES with its own ICE candidates to be sent to the OS.

As illustrated in FIG. 3, the VPN method 400 may include data flows, connections, signaling, requests, and/or the like illustrated with reference to label 406. With reference to label 406, the VPN router 102 and/or the VPN server 104 may operate such that the VES informs the OD's ICE candidates to the OS.

As illustrated in FIG. 3, the VPN method 400 may include data flows, connections, signaling, requests, and/or the like illustrated with reference to label 407. With reference to label 407, the VPN router 102 and/or the VPN server 104 may operate such that the OS connects using their local and remote candidates, the OS and the OD establish a connection through the OBR with the following steps:

With reference to label 407a, the VPN router 102 and/or the VPN server 104 may operate such that the OS sends a HELLO message to the OD in order to establish a path between the two. With reference to label 407b, the VPN router 102 and/or the VPN server 104 may operate such that the OD responds back to the OS with a HELLO to establish the reverse path between the two. With reference to label 407c, the VPN router 102 and/or the VPN server 104 may operate such that the connection between the OS and the OD has been established using specific IP addresses and port numbers.

As illustrated in FIG. 3, the VPN method 400 may include data flows, connections, signaling, requests, and/or the like illustrated with reference to label 408. With reference to label 408, the VPN router 102 and/or the VPN server 104 may operate such that the OD sends a directive to underlying operating system to perform the following:

With reference to label 408a, the VPN router 102 and/or the VPN server 104 may operate such that the OD informs the operating system to create a port forwarding rule from an internal local WAN port to the configured VPS port. With reference to label 408b, the VPN router 102 and/or the VPN server 104 may operate such that the forwarding from the public IP/port to the local WAN IP/port gets established as a part of the HELLO exchange.

As illustrated in FIG. 3, the VPN method 400 may include data flows, connections, signaling, requests, and/or the like illustrated with reference to label 409. With reference to label 409, the VPN router 102 and/or the VPN server 104 may operate such that the OS informs the VPC to use the source port of the established connection as its source port and also the destination public IP and port of the established connection to use to establish a connection to the VPS.

As illustrated in FIG. 3, the VPN method 400 may include data flows, connections, signaling, requests, and/or the like illustrated with reference to label 410. With reference to label 410, the VPN router 102 and/or the VPN server 104 may operate such that the OBR successfully establishes a connection between the VPC and the VPS via a specific combination of external IPs and ports that was determined by the methodology described herein. One of two types of connections may be established: (a) A direct connection between the VPC and the VPS, and/or (b), If a direct connection is not possible, the OBR acts as a relay between the VPC and the VPS.

Figure 4:
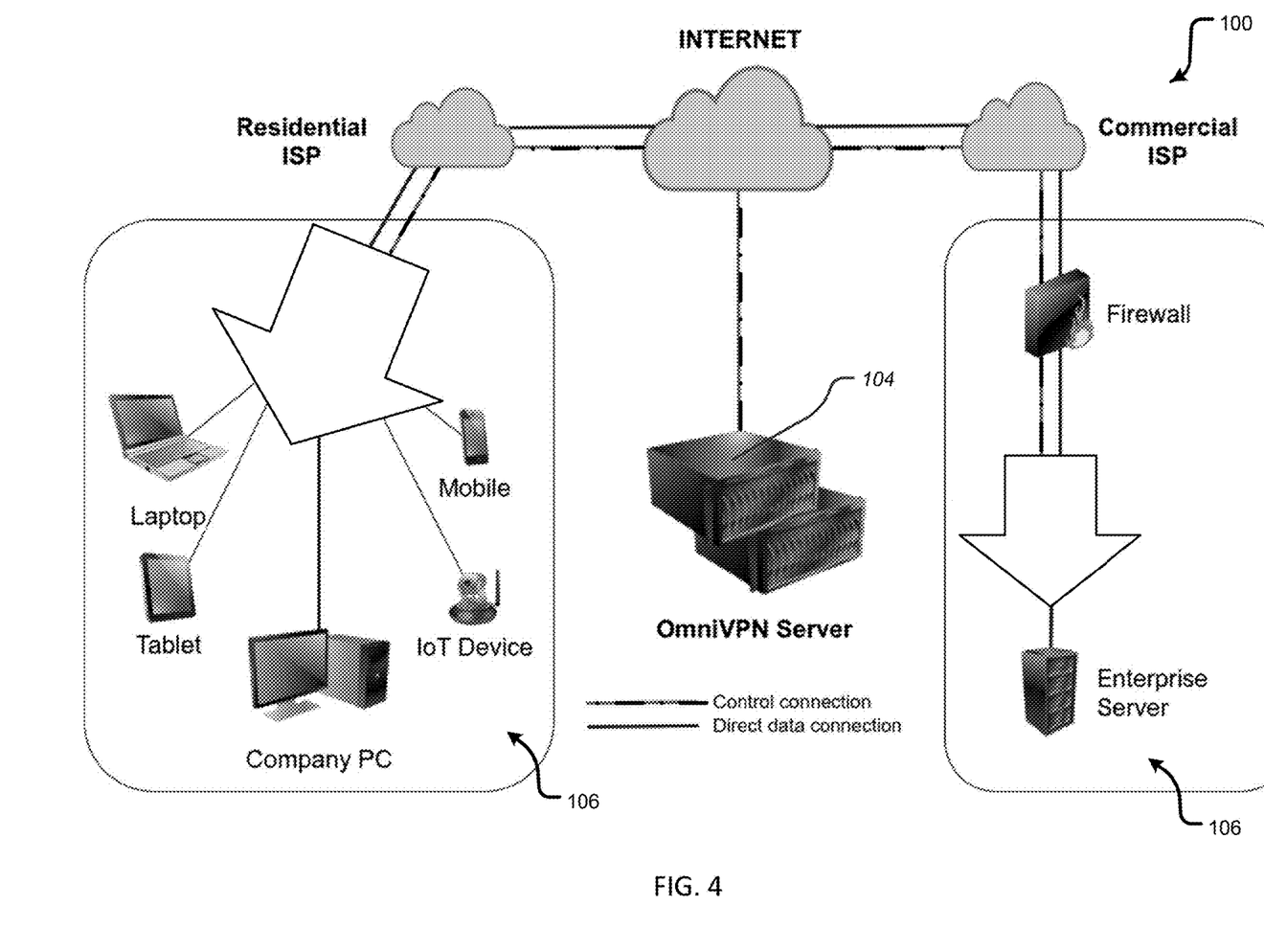
FIG. 4 illustrates an exemplary network diagram of another system implementing the disclosed virtual private network where control connections and direct data connections are established in accordance with aspects of the disclosure.

FIG. 4 illustrates an exemplary network diagram of another system implementing the disclosed virtual private network where control connections and direct data connections are established in accordance with aspects of the disclosure.

Figure 5:
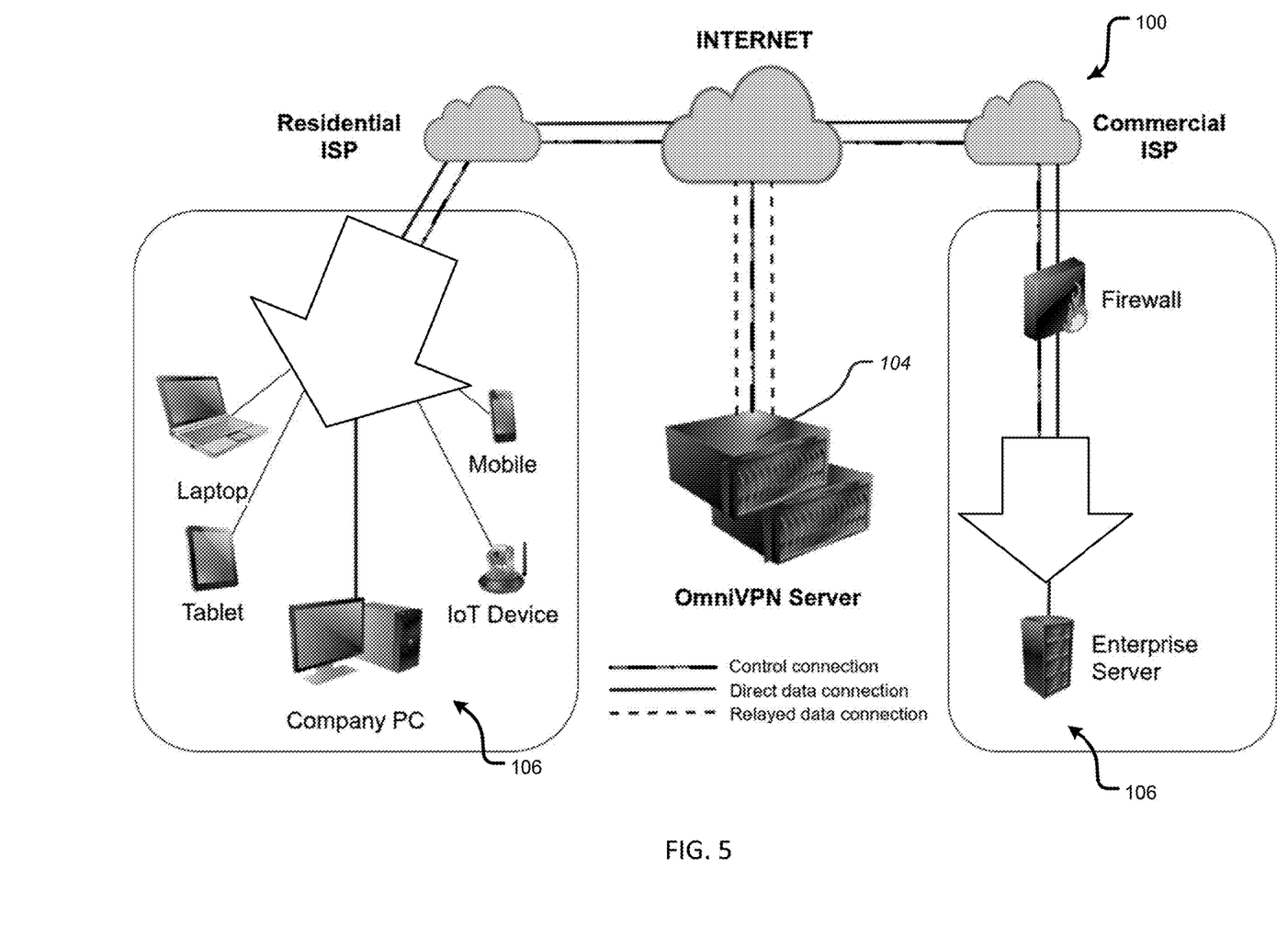
FIG. 5 illustrates an exemplary network diagram of the system of FIG. 4 implementing the disclosed virtual private network where a relayed data connection has been established in accordance with aspects of the disclosure.

FIG. 5 illustrates an exemplary network diagram of the system of FIG. 4 implementing the disclosed virtual private network where a relayed data connection has been established in accordance with aspects of the disclosure.

In particular, FIG. 4 and FIG. 5 show another system implementation of a VPN system 100 that may include the device 106 and/or the VPN server 104. The device 106 and/or the VPN server 104 may create a virtual private network (VPN) over a public network, such as the Internet, a residential ISP, a commercial ISP, another type of network as described herein, and/or the like and connect the device 106.

As illustrated in FIG. 4 and FIG. 5, the functionality of the VPN router 102 as previously described may be implemented in the device 106. More specifically, the device 106 may be implemented without the VPN router 102. In particular aspects, the device 106 may implement an OmniVPN software, an OmniVPN client, an OmniVPN configuration, a OmniVPN feature and/or the like (hereinafter the OmniVPN feature) as previously described.

The OmniVPN feature may be pre-installed or post-installed on the device 106. In one aspect, the OmniVPN feature may be an application downloaded and installed in the device 106. In one aspect, the OmniVPN feature may be an application available through distribution platforms called app stores, such as the Apple App Store, Google Play, Windows Phone Store, BlackBerry App World, and the like.

Accordingly, the disclosure provides a device, system, and/or method implementing a solution, independent of VPN protocols, to make VPN connections over any network access technology. As described herein, the disclosed device, system, and/or method, may implement a solution independent of VPN protocols to make VPN connections over any network access technology. More specifically, the disclosure presents a system and a method to overcome the limitations coming from, related to, and/or the like of a configuration of access routers, ISP practices, and/or the like.

For the purposes of this disclosure a computer readable medium stores computer data, which data can include computer program code, such as the VPN method 400, that is executable by a processor of the VPN router 102, the VPN server 104, the device 106, and/or the like, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), satellite link, the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, 4G (4th generation mobile networks or 4th generation wireless systems), Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Mufti-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the disclosure, the methods described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The disclosure includes any and all aspects of the following claims.

The invention claimed is:

1. A virtual private network (VPN) system configured to create a virtual private network (VPN) over a network, the virtual private network (VPN) system comprising:
   a virtual private network (VPN) router configured to monitor communication with a network, a device, a router, and/or a virtual private network (VPN) server;
   the virtual private network (VPN) router, after failing to connect directly over the network to a destination virtual private network (VPN) router, is configured to communicate with the virtual private network (VPN) server to obtain information regarding IP addresses and port numbers of the destination virtual private network (VPN) router that are accessible via the Internet; and
   the virtual private network (VPN) router is configured to make a connection to one of the IP addresses and port numbers that are accessible via the Internet to connect over the network to the destination virtual private network (VPN) router,
   wherein the network comprises at least one of the following: a private network and a public network.

2. The virtual private network (VPN) system according to claim 1 wherein the virtual private network (VPN) router is configured to make control connections and direct data connections with another router.

3. The virtual private network (VPN) system according to claim 1 wherein the virtual private network (VPN) router is configured to operate independent of virtual private network (VPN) protocols.

4. The virtual private network (VPN) system according to claim 1
   wherein the virtual private network (VPN) router is configured, if none of the IP addresses and port numbers that are accessible via the Internet work, utilize the virtual private network (VPN) server to establish connections between the virtual private network (VPN) routers through the virtual private network (VPN) server; and
   wherein the virtual private network (VPN) server is configured to generate VPN signaling and the virtual private network (VPN) server is further configured to relay data packets between virtual private network (VPN) routers.

5. The virtual private network (VPN) system according to claim 4 wherein the virtual private network (VPN) router is configured to make control connections, direct data connections, and relay data connections with the virtual private network (VPN) server.

6. The virtual private network (VPN) system according to claim 1 wherein the virtual private network (VPN) server comprises a VPN Broker and Relay (OBR) and virtual private network (VPN) Exchange Server (VES).

7. The virtual private network (VPN) system according to claim 1 wherein virtual private network (VPN) server is configured to operate independent of virtual private network (VPN) protocols.

8. A virtual private network (VPN) system configured to create a virtual private network (VPN) over a network, the virtual private network (VPN) system comprising:
   a virtual private network (VPN) router configured to monitor communication with a network, a device, a router, and/or a virtual private network (VPN) server;
   the virtual private network (VPN) router, after failing to connect directly over the network to a destination virtual private network (VPN) router, is configured to communicate with the virtual private network (VPN) server to obtain information regarding IP addresses and port numbers of the destination virtual private network (VPN) router that are accessible via the Internet; and
   the virtual private network (VPN) router is configured to make a connection to one of the IP addresses and port numbers that are accessible via the Internet,
   wherein the network comprises at least one of the following: a private network and a public network;
   wherein the virtual private network (VPN) router comprises a VPN Source and a VPN Destination; and
   wherein the VPN Source is configured to be independent of a VPN protocol and the VPN Destination is configured to be independent of a VPN protocol.

9. A virtual private network (VPN) method for creating a virtual private network (VPN) over a network, the virtual private network (VPN) system comprising:
   monitoring communication with a virtual private network (VPN) router related to a network, a device, a router, and/or a virtual private network (VPN) server;
   communicating with the virtual private network (VPN) server to obtain information regarding IP addresses and port numbers that are accessible via the Internet by the virtual private network (VPN) router, after failing to connect directly over the network to a destination virtual private network (VPN) router; and
   making a connection to one of the IP addresses and port numbers that are accessible via the Internet with the virtual private network (VPN) router to connect over the network to the destination virtual private network (VPN) router,
   wherein the network comprises at least one of the following: a private network and a public network.

10. The virtual private network (VPN) method according to claim 9 wherein the virtual private network (VPN) router is configured to make control connections and direct data connections with another router.

11. The virtual private network (VPN) method according to claim 9 wherein the virtual private network (VPN) router is configured to operate independent of virtual private network (VPN) protocols.

12. The virtual private network (VPN) method according to claim 9
   wherein the virtual private network (VPN) router is configured, if none of the IP addresses and port numbers that are accessible via the Internet work, utilize the virtual private network (VPN) server to establish connections between the virtual private network (VPN) routers through the virtual private network (VPN) server; and
   wherein the virtual private network (VPN) server is configured to generate VPN signaling and the virtual private network (VPN) server is further configured to relay data packets between virtual private network (VPN) routers.

13. The virtual private network (VPN) method according to claim 12 wherein the virtual private network (VPN) router is configured to make control connections, direct data connections, and relay data connections with the virtual private network (VPN) server.

14. The virtual private network (VPN) method according to claim 9 wherein the virtual private network (VPN) server comprises a VPN Broker and Relay (OBR) and virtual private network (VPN) Exchange Server (VES).

15. The virtual private network (VPN) method according to claim 9 wherein virtual private network (VPN) server is configured to operate independent of virtual private network (VPN) protocols.

16. A virtual private network (VPN) method for creating a virtual private network (VPN) over a network, the virtual private network (VPN) system comprising:
   monitoring communication with a virtual private network (VPN) router related to a network, a device, a router, and/or a virtual private network (VPN) server;
   communicating with the virtual private network (VPN) server to obtain information regarding IP addresses and port numbers that are accessible via the Internet by the virtual private network (VPN) router, after failing to connect directly over the network to a destination virtual private network (VPN) router; and
   making a connection to one of the IP addresses and port numbers that are accessible via the Internet with the virtual private network (VPN) router to connect over the network to the destination virtual private network (VPN) router,
   wherein the network comprises at least one of the following: a private network and a public network;
   wherein the virtual private network (VPN) router comprises a VPN Source and a VPN an OmniVPN Destination; and
   wherein the VPN Source is configured to be independent of a VPN protocol and the VPN Destination is configured to be independent of a VPN protocol.

17. A virtual private network (VPN) system configured to create a virtual private network (VPN) over a network, the virtual private network (VPN) system comprising:
   an Internet enabled device configured to monitor communication with a network, another device, a router, and/or a virtual private network (VPN) server;
   the Internet enabled device, after failing to connect directly over the network to a device, is configured to communicate with the virtual private network (VPN) server to obtain information regarding IP addresses and port numbers that are accessible via the Internet; and
   the Internet enabled device is configured to make a connection to one of the IP addresses and port numbers that are accessible via the Internet to connect over the network to the device,
   wherein the network comprises at least one of the following: a private network and a public network.

18. The virtual private network (VPN) system according to claim 17 wherein the Internet enabled device is configured to make control connections and direct data connections with another router.

19. The virtual private network (VPN) system according to claim 17 wherein the Internet enabled device is configured to operate independent of virtual private network (VPN) protocols.

20. The virtual private network (VPN) system according to claim 17
   wherein the Internet enabled device is configured, if none of the IP addresses and port numbers that are accessible via the Internet work, utilize the virtual private network (VPN) server to establish connections between the Internet enabled devices through the virtual private network (VP N) server; and
   wherein the virtual private network (VPN) server is configured to generate VPN signaling and the virtual private network (VPN) server is further configured to relay data packets between virtual private network (VPN) routers.

21. The virtual private network (VPN) system according to claim 20 wherein the Internet enabled device is configured to make control connections, direct data connections, and relay data connections with the virtual private network (VPN) server.

22. The virtual private network (VPN) system according to claim 17 wherein the virtual private network (VPN) server comprises a VPN Broker and Relay (OBR) and virtual private network (VPN) Exchange Server (VES).

23. The virtual private network (VPN) system according to claim 17 wherein virtual private network (VPN) server is configured to operate independent of virtual private network (VPN) protocols.

24. The virtual private network (VPN) system according to claim 17 wherein the Internet enabled device comprises at least one of the following: a laptop, a tablet, a personal computer (PC), a server, an IoT device, a device implementing Machine to Machine (M2M) communication, a wireless device, a mobile phone, mobile equipment, a mobile hotspot, a wearable device, a mobile station, user equipment (UE), a cellular phone, a smartphone, a handset, a PDA, a smartphone, and a wireless dongle.

25. A virtual private network (VPN) system configured to create a virtual private network (VPN) over a network, the virtual private network (VPN) system comprising:
   an Internet enabled device configured to monitor communication with a network, another device, a router, and/or a virtual private network (VPN) server;
   the Internet enabled device, after failing to connect directly over the network to a device, is configured to communicate with the virtual private network (VPN) server to obtain information regarding IP addresses and port numbers that are accessible via the Internet; and
   the Internet enabled device is configured to make a connection to one of the IP addresses and port numbers that are accessible via the Internet,
   wherein the network comprises at least one of the following: a private network and a public network;
   wherein the Internet enabled device comprises a VPN Source and a VPN Destination; and wherein the VPN Source is configured to be independent of a VPN protocol and the VPN Destination is configured to be independent of a VPN protocol.

\* \* \* \* \*